US012032428B2

(12) United States Patent
Gupta (10) Patent No.: US 12,032,428 B2
(45) Date of Patent: Jul. 9, 2024

(54) ASYNCHRONOUS FIFO FOR POWER-DOMAIN CROSSING

(71) Applicant: WESTERN DIGITAL TECHNOLOGIES, INC., San Jose, CA (US)

(72) Inventor: Navneet Gupta, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 194 days.

(21) Appl. No.: 17/342,239

(22) Filed: Jun. 8, 2021

(65) Prior Publication Data

US 2022/0391008 A1 Dec. 8, 2022

(51) Int. Cl.
G06F 1/3287 (2019.01)
G06F 1/12 (2006.01)
G06F 1/28 (2006.01)
G06F 13/20 (2006.01)

(52) U.S. Cl.
CPC .............. *G06F 1/3287* (2013.01); *G06F 1/12* (2013.01); *G06F 1/28* (2013.01); *G06F 13/20* (2013.01)

(58) Field of Classification Search
None
See application file for complete search history.

(56) References Cited

U.S. PATENT DOCUMENTS

| 6,256,320 | B1 * | 7/2001 | Tang | H04J 3/0685 |
| | | | | 370/462 |
| 6,366,530 | B1 | 4/2002 | Sluiter et al. | |
| 7,539,789 | B1 * | 5/2009 | Ogden | G06F 5/065 |
| | | | | 710/36 |
| 9,104,345 | B2 | 8/2015 | Agrawal et al. | |
| 9,411,722 | B2 | 8/2016 | Yap | |
| 10,048,893 | B2 | 8/2018 | Goikhman et al. | |
| 10,423,553 | B2 | 9/2019 | Kim et al. | |
| 2008/0189563 | A1 * | 8/2008 | Itkin | G06F 1/3203 |
| | | | | 713/300 |
| 2016/0328182 | A1 * | 11/2016 | Goikhman | G06F 3/0688 |
| 2018/0174623 | A1 * | 6/2018 | Xu | G11C 7/1012 |

OTHER PUBLICATIONS

Ryan W. Apperson et al.; "A Scalable Dual-Clock FIFO for Data Transfers Between Arbitrary and Haltable Clock Domains," IEEE Transactions on Very Large Scale Integration (VLSI) Systems, vol. 15, No. 10, Oct. 2007.

* cited by examiner

*Primary Examiner* — Fahmida Rahman
(74) *Attorney, Agent, or Firm* — ARENTFOX SCHIFF LLP (57) ABSTRACT

In one aspect of the disclosure, a circuit includes an AFIFO in a first power domain coupled to a first data bus and configured to store up to N data words corresponding to N respective AFIFO outputs. A multiplexer (MUX) in the first power domain selectively coupled to the N AFIFO outputs may transfer, upon receiving a MUX input, less than N words onto a fixed interface. Read logic in a second power domain may send an asynchronous read pointer to the MUX input and may transfer the words output from the fixed interface to a second data bus. Write logic in the first power domain may send asynchronous write pointers to the AFIFO for tracking data writes thereto and to the read logic to determine values of the read pointer.

20 Claims, 5 Drawing Sheets

ASYNCHRONOUS FIFO FOR POWER-DOMAIN CROSSING

BACKGROUND

Field

This disclosure is generally related to electronic devices and more particularly to integrated circuits that use different power domains.

INTRODUCTION

In integrated circuit technology, using different power domains corresponding to different circuit blocks can conserve power by enabling active circuit blocks while disabling others. Different power domains can also allow the designer to provide higher margins on high-frequency standard cells to meet timing specifications, for example, and lower power in circuit blocks that can tolerate it, which provides advantages in speed and performance while reducing overall power consumption.

As the demand for energy-efficient application specific integrated circuits (ASICs) and other devices continues to increase, so too has the number of different power domains implemented by manufacturers in their designs. Challenges may arise at the interface of two power domains where signals from one domain traveling to the other need to be properly converted to ensure inter-domain operability.

One conventional technique for converting signals between power domains is to add an asynchronous first-in-first-out (FIFO) circuit at the power domain interface to relax timing requirements and coordinate data exchanges using write and read pointers. One major challenge of this approach is that the large FIFO depth at the power-domain interface requires arrays of power-conversion cells including isolation circuits, level-shifters, and the like, to properly condition the data in the FIFO to be compatible with the new power domain and corresponding power modes. These cells consume large areas on the die, which in turn places practical limits on the overall achievable size of the circuit and creates routing challenges due to the numerous signals. The large cell array can also hemorrhage significant current from the device, effectively taxing the very power requirements that the power domains were designed to control.

SUMMARY

An aspect of a circuit is disclosed herein. The circuit includes an asynchronous first-in first-out buffer (AFIFO) in a first power domain. The AFIFO is coupled to a first data bus and is configured to store N data words corresponding to N respective AFIFO outputs. The circuit further includes a multiplexer (MUX) coupled to the N AFIFO outputs. The MUX is configured to transfer data over a second data bus of less than N words upon receiving a MUX input. The second data bus crosses an interface to a second power domain. The circuit also includes read logic in the second power domain configured to send an asynchronous read pointer across the interface to a first circuit element for use in providing the MUX input, wherein a width of the second data bus is independent of a depth N of the AFIFO.

Another aspect of a circuit is disclosed herein. The circuit includes an asynchronous first-in first-out buffer (AFIFO) in a first power domain. The AFIFO is coupled to a first data bus and is configured to store N data words corresponding to N respective AFIFO outputs. The circuit further includes a multiplexer (MUX) coupled to the N AFIFO outputs and configured to asynchronously transfer, upon receiving a MUX input, less than N words onto a fixed interface. The circuit also includes read logic in a second power domain configured to send an asynchronous read pointer to the MUX input and to send the words transferred onto the fixed interface to a second bus, wherein a width of the second data bus is independent of a depth N of the AFIFO.

Still another aspect of a circuit is disclosed herein. The circuit includes asynchronous first-in first-out buffer (AFIFO) means in a first power domain. The AFIFO means is coupled to a first data bus for storing N data words corresponding to N respective AFIFO outputs. The circuit further includes multiplexer (MUX) means in the first power domain coupled to the N AFIFO outputs for transferring, upon receiving a MUX input, less than N words onto a fixed interface. The circuit also includes reading means in a second power domain for sending an asynchronous read pointer to the MUX input and for sending the words transferred to the fixed interface to a second bus. The circuit further includes writing means in the first power domain for sending asynchronous write pointers to the AFIFO for tracking data writes and to the read logic to determine values of the read pointer, wherein a width of the second data bus is independent of a depth N of the AFIFO.

It is understood that other aspects of the circuit will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, with reference to the accompanying drawings, wherein.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present. For purposes of this disclosure, reference to "a first circuit element" and "a second circuit element" for performing a function does not preclude additional circuit elements from also performing the function.

In the following detailed description, various aspects of a circuit will be presented. These aspects are well suited for any type of discrete or integrated circuit device that includes different power domains. Such devices can be used, for example, in SSD/storage controllers, Bluetooth or WiFi chips, communications devices, and virtually any type of ASIC, system on a chip (SoC), field programmable gate array (FPGA), digital signal processor (DSP), or any other mixed signal circuit device for performing a wide variety of circuit functions in diverse applications. Accordingly, any reference to a specific apparatus or method is intended only to illustrate the various aspects of the present disclosure, with the understanding that such aspects may have a wide range of applications without departing from the spirit and scope of the present disclosure.

The implementation of multiple power domains can play a critical role in designing and manufacturing integrated circuit chips that are targeted to consume less power. In some cases, the different power domains may correspond to circuit blocks having different categories of applications (digital versus analog, and the like). A power management block, for example, may operate using its own power domain. High-frequency/high performance digital or standard-cell logic may be implemented on another power domain, using for instance a voltage swing or margin configured to accommodate worst case timing conditions. Some circuit domains may use the same power levels, voltages, etc. Yet, they may still be partitioned into different power domains for power consumption purposes or in other cases, for noise isolation or still other motivations specific to the target circuit design.

Signals crossing between power domains are typically passed through low power cells such as isolation cells and level shifters. Isolation cells include circuits that may be used at output signals of a powered-down block to prevent unknown or floating signals from propagating into powered blocks and causing logic errors. Isolation cells can further be used to isolate the outputs of cells in one powered-down domain from the input of another powered-up domain, or to isolate the inputs of cells in a powered-down domain from active outputs. Retention registers may be used in some cases at power domain interface where it is necessary to emulate active outputs, for example, or to sustain the operation of a powered-up circuit block. In addition, it is often the case that multiple power domains are concurrently operating at different voltage levels, in which cases other types of cells may be used. For example, a level-shifter cell may be used to shift a signal voltage range from one voltage domain to another.

These types of isolation, level-shifting and other low-power cells may generally be found at or near the interface of different power domains. As discussed in greater detail herein, these cells tend to take up additional area on the die and also tend to consume power. As the size of the bus or the number of data traces increases between power domains, for examples, individual cells are needed to accommodate each conductor. Therefore, it is desirable to seek implementations of power domain interfaces in which the use of these cells is minimized to that which is necessary to enable the different domains to collectively function across the different process corners. Unfortunately, currently attempted solutions to power domains generally require circuits having a large data bus (that is to say, a number of bits being concurrently transferred between domains). This in turn requires a comparatively large number of cells to accommodate properly functioning power domain interfaces across all operational modes and fabrication processes, which can consume considerable area on the die and can use large amounts of power. Thus, approaches attempted heretofore to accommodate effective power domain interfaces have been generally undesirable for at least these reasons.

As manufacturers have progressively focused on energy efficient ASICs in recent years, the number of power domains and the complexity of their interfaces have only increased. Hence, the challenges that initially befell circuit designers with respect to finding viable solutions for relatively straightforward power domain implementations have been amplified in recent years.

Figure 1:
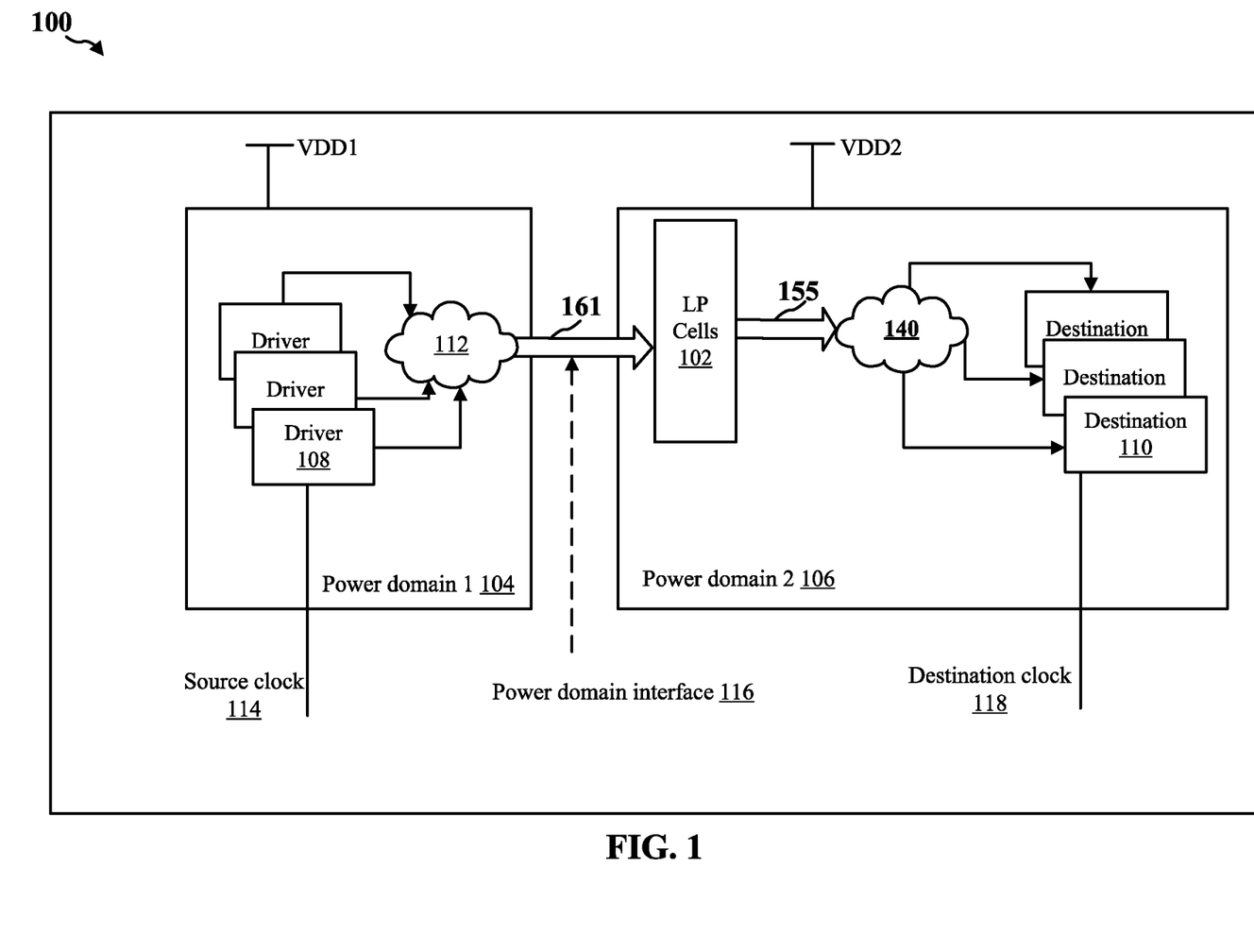
FIG. 1 is a conceptual diagram of a circuit having power domains and a one-way power domain interface.

FIG. 1 is a conceptual diagram of a circuit 100 having two different power domains 1 (104) and 2 (106) and a one-way power domain interface 116. For purposes of this disclosure, each of the information-carrying signals 161 that crosses a power domain interface 116 en route from a first power domain (104) driven by supply VDD1 to a second power domain (106) driven by supply VDD2 may be considered part of the power domain interface. Power domain 1 (104) may include a first set of circuits including a plurality of drivers 108 driven by a source clock 114, along with interface circuits that may include an asynchronous FIFO buffer (AFIFO) or similar circuit structure. Drivers 110, which may include an array of flip flops timed by a source clock 114 and other digital circuits, may place a plurality of bits onto the bus represented by signals 161. The received data, such as outputs corresponding to various digital logic, etc., are manipulated by low power cells 102 to render the received data appropriate for use in power domain 2 (106). The manipulated data from low power cells 102 may be provided to some read logic or other digital logic block 140 via an internal bus 155. The data may thereafter be routed to their respective drivers 110. For example, the destination circuits may include an array of flip flops and other circuits. The data may be latched into a register by a separate destination clock 118 that is independent of, and asynchronous from, source clock 114.

In some arrangements, it is possible to have a bi-directional power domain interface, wherein one portion of the interface and its adjacent area may handle the transfer of signals in one direction, and another portion of the interface and its adjacent area may manage the transfer of signals in the other direction. To avoid unduly obscuring the concepts of this disclosure, Applicant's diagrams will focus on one way power domain crossings. It should be understood, however, that the present disclosure is intended to encompass such bi-directional signal flow applications.

Referring still to FIG. 1, to ensure proper circuit operation across different process corners, a static timing analysis (STA) may be conducted to ensure that the setup and hold times from the drivers 108 to the drivers 110 are satisfied, in order to perform timing closure on the power domain interface. Timing closure is an optimization process that may be conducted to meet timing requirements such as the various setup and hold requirements for digital circuit elements such as flip-flops and other synchronous combinational logic. Setup is typically considered the minimum time required for data (e.g., at a flip flop input) to be stable before the clock's active edge can reliably latch the data. Hold time, inversely, is the minimum time required for data to remain stable at the input after the clock's active edge. The static timing analysis may be used in this process to validate timing performance by checking all possible paths for potential timing violations. Only after all such paths are validated, can timing closure on the power domain interface be complete. Where multiple power domains are involved, timing closure may be difficult for a variety of reasons. For one, the source clock 114 and destination clock 118 are buffered in different power supplies—namely, VDD1 and VDD2, respectively. This can produce clock skew and jitter uncertainties between the starting point and endpoint of timing closure that are generally larger and more unpredictable.

Another problem with the power domain interface 116 is that the source power grid (i.e., on VDD1 in FIG. 1) and the destination power grid (i.e., on VDD2) can have different IR drops. This disparity can lead to the need for additional margin for setup and hold timing closure. The problem is further exacerbated in cases where the number of different power sources increases. For each such power source, combining the ripple/deviation of the power sources, the disparate IR drops on the different power grids, and the potentially-significant amplitude variation on different power domains (e.g., 100 millivolts (mV) or greater) can result in timing margins that as a practical matter are difficult to achieve. In addition, using external power management circuits and power sources as a means to guarantee the worst case timing changes between different power domains generates further difficulties. These latter difficulties stem in part from the fact that the power management circuits add margin in the STA in order to guarantee worst case timing scenarios. However, the added margin also limits the maximum achievable speed on the interface, and makes fixing of hold violations even more difficult.

In addition to these timing issues, the low power cells 102 are needed at the power domain interface 116 and signals 161. The accurate placement of these cells on the die may be critical to ensure solid performance. As noted above, the cells 102 consume area and power. As the width of power domain interface 116 and the number of signals 161 becomes larger, the number of cells 102 increases. In the initial design, the manufacturer must be sure to leave adequate die area for the cells 102.

Figure 2:
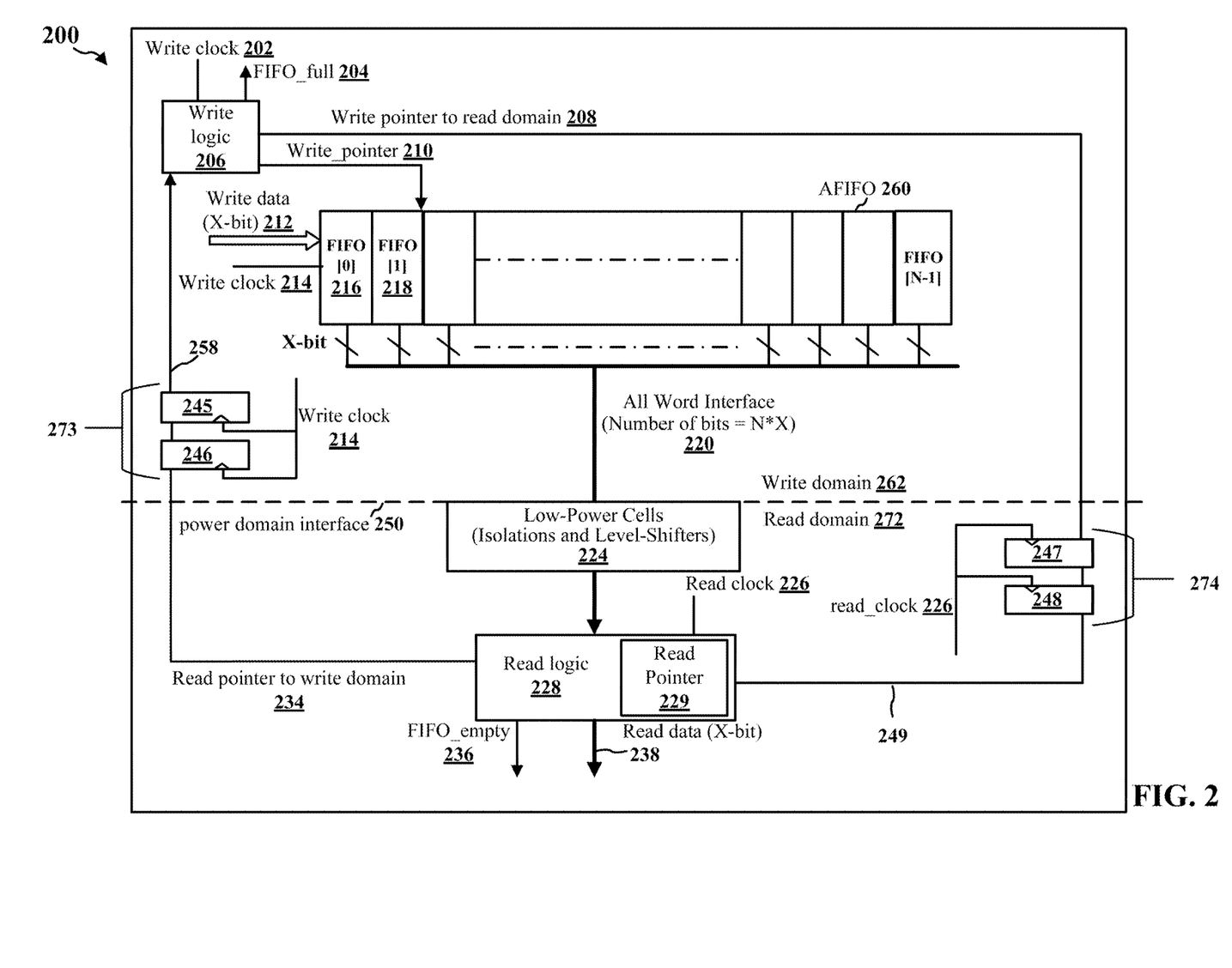
FIG. 2 is a block diagram of a circuit having a power domain interface.

FIG. 2 is a block diagram of a circuit 200 having a power domain interface 250. The write domain 262 region is in the upper portion of the circuit, while the read domain 272 is in the lower portion. With initial reference to the write domain 262, a write logic 206 circuit block includes write pointer generation logic which controls writes to a FIFO buffer 260. The FIFO buffer 260 is conventionally used to relax the above-described timing constraints resulting from the power domain interfaces' resulting disparities as initially described with reference to FIG. 1. The write logic 206 may receive a write clock input 214 and may output a FIFO full signal 204 when the FIFO buffer 260 is determined to be filled with data. Write logic 206 can control data writes to the FIFO buffer via the write pointer 210 together with a write data bus 212 and a write clock input 214. Write logic 206 may also receive a read pointer signal 258 originating from circuits within the read power domain to assist write logic 206 in tracking the status of data read operations on the FIFO buffer 260. Exemplary buffer entries include FIFO[0] 216 and FIFO[1] 218. The data width of the write data bus may be X, wherein each data entry or word FIFO[0]-FIFO[N−1] is X bits wide. Thus the width of the write data bus 212 corresponds with an X-bit word from the FIFO buffer 260. The FIFO buffer 260 in this example includes a total depth of N. As a result, in this conventional design, the output of the FIFO buffer 260 includes an all word interface 220 with a number of bits corresponding to N×X.

Circuit 200 further includes an array of low-power cells 224, including elements like isolation cells and level-shifters, and similar such cells as described above. In view of the all word interface due to the FIFO buffer 260, the circuit 200 may require a large number of low-power cells from the array of low-power cells 224 to transform each of the X bits of the N-deep FIFO output to a condition suitable for operation in the read domain 272. Write logic 206 also may receive a read pointer signal 258 originating from read pointer logic 229 in the read domain 272. The read pointer signal is routed through an N-stage synchronizer 273 driven by write clock input 214. The number N of stages on the N-stage synchronizer 273 is two, corresponding in this example to the two flip-flops 245 and 246, which are respectively latched by write clock input 214.

After the data from the FIFO buffer 260 is read onto the all word interface 220 and passes through the array of low power cells 224 to the read domain 272 portion, the data is received by a circuit block that includes read logic 228. The read logic can output the read data onto an X-bit read data bus 238 using a read clock 226 input, where the read clock 226 is powered by the power supply of the read domain 272. Read logic 228 may include a FIFO empty 236 output to provide other circuits with an indication of the FIFO buffer data status. Read logic 228 may also include read pointer logic 229, which may use read clock 226 and write pointer signal 249 originating from the write domain 262 to determine a condition of the FIFO buffer 260 and to maintain a read pointer. Read logic 228 may also transmit the read pointer to the write logic 206 via N-stage synchronizer 273. Read logic can also transmit a read pointer to write domain signal 234. Write pointer signal 208 may be provided from write logic 206 to a similar N-stage synchronizer 274 within read domain 272, including flip-flops 247 and 248, where N=2 for the same reasons given with respect to N-stage synchronizer 273. It will be appreciated that circuit blocks and signals residing in or originating from the write domain 262 or the read domain 272 are powered by a source corresponding to the write domain 262 or the read domain 272.

Each write operation to the FIFO buffer 260 in FIG. 2 is X bits wide as noted, and is written to the location identified by write pointer 210. Similarly, each read operation from the FIFO buffer is X bits and is read from the location identified by read pointer in read pointer logic 229. In this example, the read and write of the FIFO buffer 260 will access all the words of the FIFO buffer. Thus for the FIFO buffer 260 to operate properly in the circuit 200 of FIG. 2, the full depth of the FIFO buffer should be accessible by both the read logic 228 and the write logic 206. However, because the read and write logic blocks are located in different power domains, the full FIFO depth in this configuration needs to cross the power domain to allow full access to the data. Thus, in the circuit of FIG. 2, the all word interface 220 and corresponding circuits encompass the power domain interface 250.

For the example in FIG. 2, the FIFO buffer is maintained in the write domain 262. Because the read pointer is generated in read pointer logic 229, the read pointer is gray-encoded and synchronized in the write domain. During synchronization, uncertainty is present in the read pointer value in the write domain due to the nature of the two-stage synchronizer (i.e., a new value can arrive one clock early or late). Further, if the read pointer is incrementing on multiple adjacent clock cycles, some read pointer values may be missed in the write domain. For example, the binary read pointer value can go directly to a value of 2 from 0 in the write domain after gray decoding. As a consequence of this uncertainty and the possibility of missed values, the size of the power domain interface for the standard FIFO buffer design in FIG. 2 cannot be reduced because the read pointer signal 258 in the write domain cannot be used to identify the exact location that the read logic is expecting to read.

For this same reason, the FIFO buffer as configured in FIG. 2 also adds significant complexity to the design. A large number of signals are crossing the power domain interface 250. As noted above, low-power cells must be implemented to suitably transform each of the corresponding signal values received from the FIFO buffer 260. Thus the added power consumption and the accompanying sacrifices in die area, along with the need to invest design time and effort into very precise low-power cell arrangements on the die free of the inherent routing difficulties, are brought to bear with the design of FIG. 2.

To add further context to these difficulties, a concrete example of this problem can be applied to a typical 128-bit bus interface. If an AFIFO is added to the circuit to relax timing requirements for a bit depth of 16, the interface size increases from 128 bits to 128×16=2048 bits. The attendant increase in low-power cell requirements, and the associated power consumption and die area increases, are significant. Further, such large data bus sizes are likely to add routing difficulties, particularly at the power domain interface 250 where the data traces would be concentrated. This problem applies to each asynchronous interface between multiple power domain boundaries on a single integrated circuit, which are increasingly common, and can increase the need for die area by multiple factors in some instances. The problems worsens for multiple bus interfaces such as Advanced eXtensible interface (AXI), and others that can implement from 64 to 256-bit data interfaces with additional address interfaces of 32-128 bits.

According to one aspect of the disclosure, an AFIFO is implemented to relax timing requirements across a power domain interface while concurrently limiting the data width of the corresponding interface. This objective may be accomplished without sacrificing performance due to potential uncertainties in the read pointer value such as those described above. A significant benefit of these embodiments is that the circuit configurations can receive all the advantages of an AFIFO (such as easing timing margins) without making the power domain interface size prohibitively large. Unlike in conventional implementations described above, the width of the power domain interface is independent of the FIFO buffer depth. Rather, the power domain interface size between read and write domains in one embodiment depends only on the number of synchronizer stages and the ratio of read-to-write data rates. Moreover, unlike the implementation in FIG. 2, the embodiments in this aspect are configured to ensure a reliable and predictable read pointer in the write domain after synchronization in the clock cycles and during performance of an FIFO buffer read operation, without any reduction in throughput.

Figure 3:
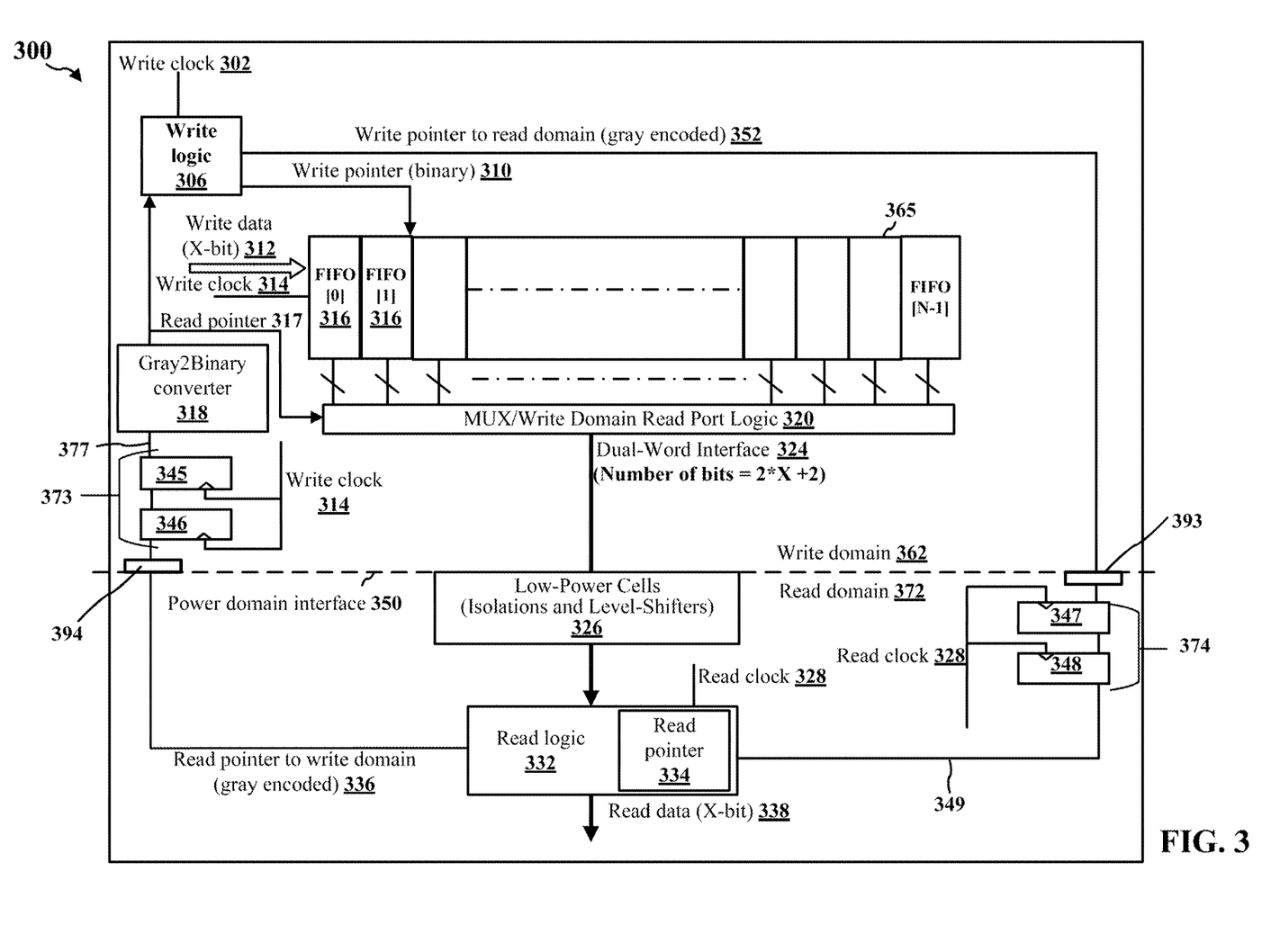
FIG. 3 is a block diagram of a circuit having a power domain interface in accordance with embodiments herein.

FIG. 3 is a block diagram of a circuit 300 having a power domain interface 350 in accordance with embodiments herein. The circuit 300 is partitioned into two regions including a write domain 362 and a read domain 372. The write domain includes a write logic block 306, which includes write pointer generation logic. The write pointer generation logic generates a binary write pointer 310 for controlling writes to FIFO buffer 365. The FIFO buffer 365 includes an X-bit write data bus 312, a write clock input 314, and the binary write pointer 310. The write pointer generation logic of write logic block 306 also sends an asynchronous gray-encoded write pointer 352 to read domain 372. Upon entry in the read domain 372, the asynchronous gray-encoded write pointer 352 enters a two-stage synchronizer 374, which in this embodiment includes a pair of flip flops 347 and 348, each having a read clock input 328. While the two-stage synchronizer 374 is shown for purposes of illustration, in other embodiments, different types of synchronizer circuits having different elements or a different number of stages can be used. Two-stage synchronizer 374 may be used to synchronize the asynchronous gray-encoded write pointer 352 to the read clock input 328 for use in the read domain 372, as well.

After passing through the two-stage synchronizer 374, the synchronized write pointer 349 in the read domain is input into a read logic 332 block located in the read domain 372. Read logic 332 includes a read clock input 328 and a read pointer 334 that includes read pointer generation logic. Read pointer generation logic of read pointer 334 generates a gray-encoded read pointer which is read_pointer_to_write_domain signal 336 (underscore used for ease of reference). Read_pointer_to_write_domain signal 336 is sent to the write domain 362 across power domain interface 350. Referring back to the write domain 362, read_pointer_to_write_domain signal 336 after passing through low-power cells 394 is input into the two-stage synchronizer 373, which is latched by a write clock input 314. Two-stage synchronizer 373 may include two stages of flip-flops 345 and 346, and is used to synchronize the read_pointer_to_write_domain signal 336, which is initially asynchronous, to the write domain 362 to produce an input signal 377 to the Gray2Binary converter 318. As with respect to the other synchronizer in the read domain 372, it will be appreciated that the synchronizer in the write domain 362 can be implemented using other or different circuit elements or numbers of stages, depending on the embodiment. The Gray2Binary converter 318 in this embodiment is used to convert the input signal 377 that is gray encoded (and now synchronized in the write domain 362 via write clock input 314) to a binary read pointer 317. In short, read logic 332 uses read pointer generator logic of read pointer 334 to perform read operations of the data via binary read pointer 317, as described further below.

The binary read pointer 317 of FIG. 3 is then input into the write logic block 306, as well as the input of Multiplexer (MUX) 320 and (write domain) read port logic. It will be appreciated that the MUX 320 and read port logic may be part of the same or different circuit blocks in alternative or additional embodiments. For clarity, MUX 320 and write domain read port logic are treated as a single block for simplicity and are often referred to herein simply as "MUX" or "MUX 320". MUX 320 receives as a SELECT input the binary read pointer 317. In general, MUX 320 is used to pass a single word or multiple words <N onto a corresponding single or multi-word (<N) interface or data bus. In this exemplary embodiment, MUX 320 passes two words in parallel onto a dual-word fixed interface 324, which is a dual-word data bus. In this example, MUX 320 may receive up to N X-bit words on its data inputs. Using binary read pointer 317, MUX 320 outputs a selected dual word (if data is available) onto dual-word fixed interface 324. As noted, in other embodiments, a different word depth less than the full depth of the FIFO buffer may optionally be used. In addition, in other embodiments, the MUX 320 may be placed in the read domain 372 instead of the write domain, with the logic modified as necessary to use the MUX in the read domain 372 to include the up to N data words output from the FIFO buffer 365. The read logic 332 and/or 334 may update a value of the read pointer in the read domain 372 to reflect and track the dual-word read. The dual-word data may be passed into the read domain and conditioned by the low-power cells 326 dedicated to conditioning the dual word. The read logic 332 may then output the read data onto an X-bit read data bus 338, e.g., using read clock input 328.

The circuit 300 in the embodiment of FIG. 3 beneficially reduces the reading on the power domain interface, and does so in a way such that the read/write pointers after passing through two-stage synchronizers 373 and 374, which are clock domain synchronizers, are predictable in the other respective domain. In the exemplary embodiment shown, while the synchronizers in both domains are two stages, the stages of the synchronizers can be another number. In this example the read_pointer_to_write_domain signal 336 and the asynchronous gray-encoded write pointer 352 to read domain are routed to the other respective domains, and the read operation from the FIFO buffer can occur (at the fastest) each alternative clock cycle to make the read and write pointers predictable with cycle accuracy after synchronization. Accordingly, with a constraint in this embodiment of a single read operation for two clock cycles, a simultaneous dual data rate operation of the FIFO buffer 365 can be performed. Thus, where data is present in the FIFO buffer 365, the dual data rate read in this embodiment allows the circuit 300 to support a single word read per clock cycle onto the dual-word fixed interface 324.

While the embodiment above describes the use of two-stage synchronizers and a dual data rate read every alternative read cycle, other embodiments can be contemplated by leveraging the above-stated advantages. Thus, for example, another number of stages may be used, or another interface different from 2x and less than the FIFO depth N can be used in other embodiments to achieve the objectives described herein.

Another key benefit of the circuit 300 of FIG. 3 is that the size of the interface (in this example for the dual-word fixed interface 324, more precisely 2x+2) is independent of the FIFO depth N. Rather, the interface size between the read domain 372 and write domain 362 (as well as the read/write pointer update rate) depends only on the number of stages of the synchronizer and the ratio of the read to write data-rate. As an example of the latter point, the amount of data crossing the power domain interface 350 for the particular application may make it desirable to increase or reduce the data width to avoid bottlenecks, but without implementing an overly large interface that may potentially go unused in many applications or that may require an excessive number of cells.

Unlike conventional AFIFO implementations, the exemplary embodiment in FIG. 3 is a true asynchronous AFIFO design in that (while not required in general) every signal crossing the power domain interface 350 is asynchronous in nature. This includes the dual-word fixed interface 324, the read_pointer_to_write_domain signal 336, and the asynchronous gray-encoded write pointer 352. Further, the exemplary embodiment of FIG. 3 shows that each of the read and write domains use synchronizers with two stages. Other embodiments may include a different number of stages in read or write domain, however, and the use of the same number of stages is for exemplary purposes only.

In some embodiments as noted above, the read_pointer_to_write_domain signal 336 and the asynchronous gray-encoded write pointer 352 are gray encoded prior to entering the two-stage synchronizers 373 and 374. The read_pointer_to_write_domain signal 336 and the asynchronous gray-encoded write pointer 352 entering the respective write domain 362 and read domain 372 can be used on every other clock cycle, and thus the read operation from the FIFO buffer 365 using the MUX 320 and write domain read port logic can occur every alternate clock cycle, for example, instead of every clock cycle. This alternate-cycle read, among other advantages, ensures predictability with cycle accuracy of the corresponding binary read pointer 317 and the binary write pointer 310 used to track the reads and writes of the FIFO buffer 365. The synchronized write pointer 349 in the read domain can be used at the read logic 332 to determine an extent to which the FIFO buffer 365 is populated with data, and thus whether additional read operations are necessary.

In some embodiments, each of the first and second synchronizers can instead operate on both rising and falling edges of a respective clock input to allow two reads within a clock cycle. This capability in turn reduces a width of the second data bus to a single word size for a specified clock frequency, along with control information such as the number N of valid bits. The synchronizers may include one or more edge detector circuits for this purpose. The read port logic may act in concert with the synchronizers on both edges of the clock to allow two reads within a clock cycle, allowing the interface width to reduce to "single data buffer size+1-data valid bit". Further, according to some embodiments, the interface width is decided by the write to read clock frequencies and stages in read/write pointer synchronizers. According to other embodiments, the read clock frequency is double that of the write clock, allowing the data-interface size between write and read domain of a "single data buffer size+1 data-valid bit". According to still other embodiments, the data interface width is chosen only by number of stages in clock domain crossing synchronizers and made independent of read to write clock frequency ratio.

Figure 4:
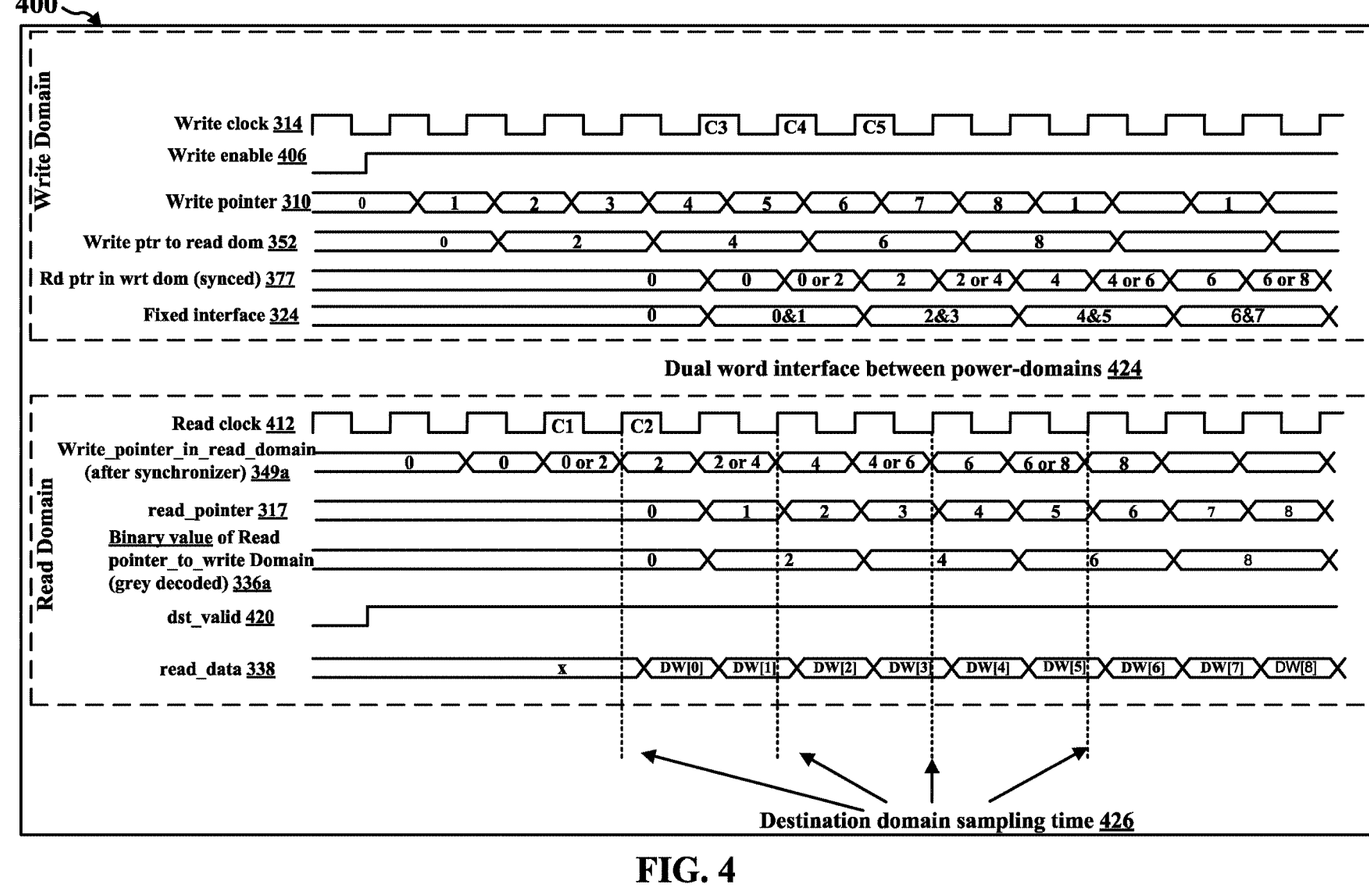
FIG. 4 is a set of timing diagrams in the read and write domains corresponding to transferring a plurality of dual data words between power domains.

FIG. 4 is a set of example timing diagrams 400 in the read and write domains corresponding to reading dual words between power domains. The timing and signaling functions in FIG. 4 can be performed by the circuit of FIG. 3, for example, including in some embodiments the write logic 306, FIFO buffer 365, MUX 320, low-power cells 326, read logic 332 and its read pointer generation logic of read pointer 334, two-stage synchronizers 373 and 374, and Gray2Binary converter 318, and one or more of the input and output signals associated with these elements. It will be appreciated that in various embodiments, not all of the above elements are necessary to perform the functions identified in FIG. 4, or alternative or additional components may be used. (In addition, in some embodiments, the MUX 320 may be positioned in the read domain 372 instead of the write domain 362. In this latter example, low power cells may be included on the dual-word fixed interface 324 to suitably shift the signals to accommodate use with MUX 320.)

Beginning with the write domain, the write clock input 314 is shown for providing timing to the write logic 306 and the FIFO buffer 365 (FIG. 3). The write clock input 314 may be the same source as the read clock 412, or they may be from separate sources. The write enable signal 406 may be provided to the FIFO buffer 365 when the FIFO buffer 365 is not full to allow data writes. With each new write request, a write operation to a new buffer location in FIFO buffer 365 occurs, and the binary write pointer 310 is incremented accordingly. The asynchronous gray-encoded write pointer 352 is the corresponding gray-encoded value for use by the read logic 332 in the read domain 372, and thus is incremented by one bit (with its LSB omitted) on alternating clock cycles. In some embodiments, the asynchronous gray-encoded write pointer 352 can be converted to binary, if desired.

Because the synchronizers in FIG. 3 are two-stages, whenever the binary write pointer 310 is changed, the synchronized write pointer 349 in the read domain includes a one clock cycle uncertainty in which its value can be either the previous value or a new value. An example of this uncertainty is shown relative to read clock cycle C1 of read clock 412 in FIG. 4, where the write_pointer_in_read_domain signal 349a can take a value of either 0 or 2. Because the two-stage synchronizer 374 ensures that the write pointer is stable for at least two clock cycles whenever changed, in the second clock cycle (e.g., corresponding to the read clock cycle C2) the correct value on the synchronized write_pointer_in_read_domain signal 349a in the write domain (here "2") is guaranteed. The synchronized write_pointer_in_read_domain signal 349a corresponds to a version of the synchronized write pointer 349 in the write domain of FIG. 3.

The circuit 300 further includes the input signal 377 in the write domain 362, which is a signal output from the two-stage synchronizer 373 in that domain. Similar to the write pointer, because the two-stage synchronizer 373 guarantees that the read pointer will be stable for two clock cycles whenever changed, the correct value of the read pointer is guaranteed in the second clock cycle, as shown at the input signal 377 which is a synchronized read pointer beginning near write clock C3 where the value settles to "0" and near C5 where the value settles to 2.

The remaining values in FIG. 3 include the dual-word fixed interface 324, which is the output of the MUX 320 as binary read pointer 317 is input to select and increment in value. Read_pointer_to_write_domain signal 336 in FIG. 3 is an asynchronous signal that represents the gray-encoded output of read logic 332. In FIG. 4, however, the grey decoded value 336a (that is, the binary value) of the read_pointer_to_write_domain signal 336 is shown. The four vertical dashed lines 426 represent the destination or read domain sampling time as defined by alternate values on the write_pointer_in_read_domain signal 349a (FIG. 4) received at the read logic 332. For purposes of this example, the vertical lines 426 also represent the dual word interface between power domains 424. The dst_valid signal 420 indicates when data is valid on the read data bus, with the dual words sequentially read out of the X-bit read data bus 338.

It should be noted that the asynchronous gray-encoded write pointer 352 entering into read domain 372 also passes through LP cells 393 in FIG. 3. In addition, the read_pointer_to_write_domain signal 336 originating from read logic 332 also passes through LP cells 394, as it crosses the domains, indicated in FIG. 3. In other embodiments, the LP cells on either side may alternatively be placed in the write domain 362 for both LP cells 393 and 394, or they may both be on the read domain 372 side. In still other embodiments, using the LP cells on a combination of both sides is also possible.

Figure 5:
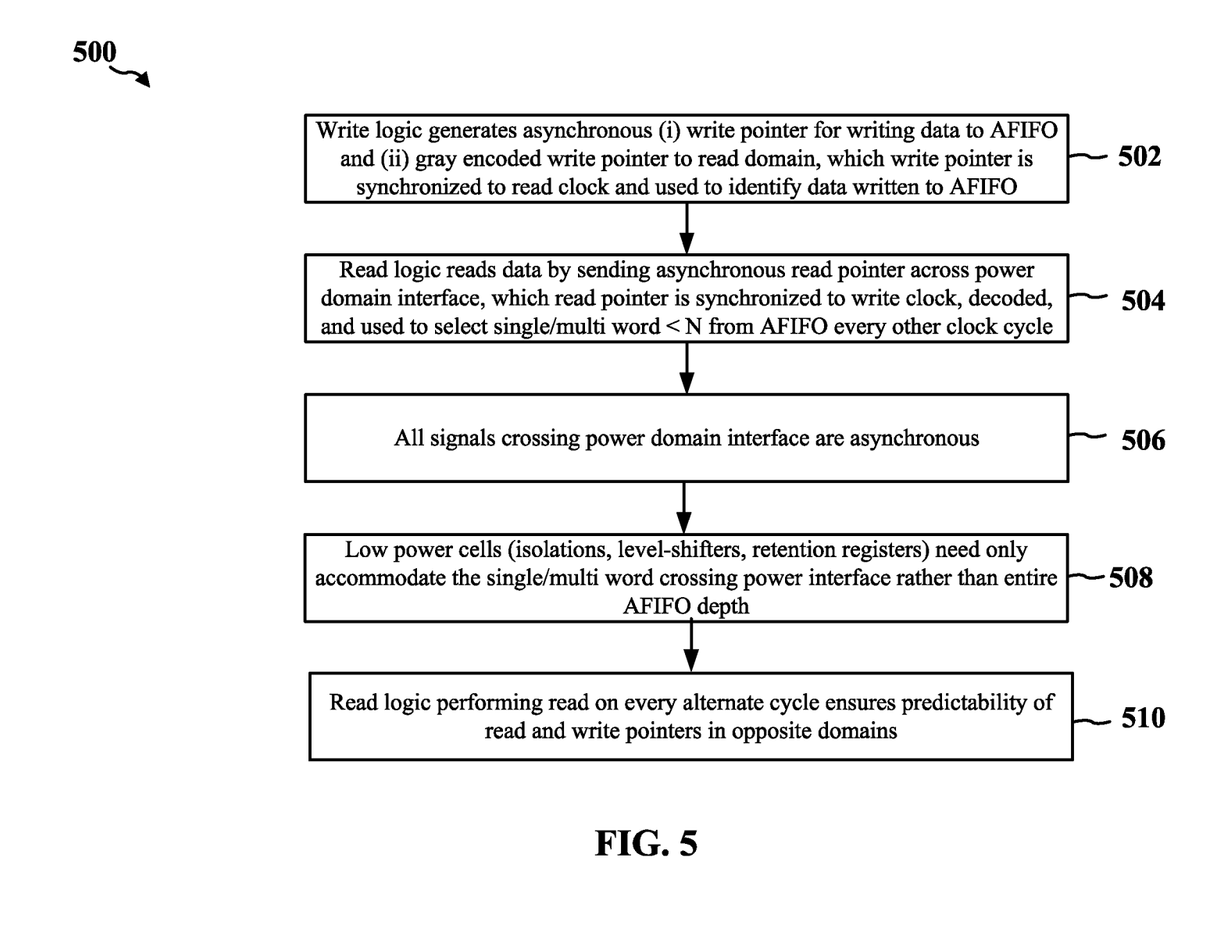
FIG. 5 is a conceptual flow diagram of an example power-domain crossing transaction.

FIG. 5 is a flow diagram 500 of an example power-domain crossing transaction. The functions described may be implemented by the various circuit blocks of FIG. 3. The functions described are not necessarily in a particular order. As shown at 502, the write logic may be configured to generate an asynchronous write pointer for tracking data writes to the FIFO buffer and a gray encoded write_pointer_to_read_domain, which may be synchronized to the read clock and used to identify data written to the FIFO buffer.

At 504, the read logic may be configured to read data by sending an asynchronous read pointer across the power domain interface. The read pointer is then synchronized to the write clock, decoded from gray code (or another suitable encoding format) into binary, and used to select one or more words from the FIFO buffer, for example, every other, or every third, clock cycle. The one or more words are configured to be less than the FIFO buffer depth. Further, all signals crossing the power domain interface may be configured asynchronous in nature (506). In addition, as a result of the smaller output data interface, low power cells need only accommodate the data on the fixed interface (508). This strategy can altogether avoid the need to populate the die with power and area consuming, difficult-to-route and place circuit arrangements. In addition, the read logic at 510 can be configured to perform a read on every alternate clock cycle, which ensures the predictability of the values of read and write pointers in opposite domains.

One exemplary application for the circuits as described herein is for use in a solid-state drive (SSD) controller. However, the circuits may be used in a wide variety of applications. Also, in some embodiments, the techniques herein may be performed, in part, using one or more processors, controllers, and the like. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure.

In one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A circuit, comprising:
an asynchronous first-in first-out buffer (AFIFO) in a first power domain coupled to a first data bus and configured to store N data words corresponding to N respective AFIFO outputs;
a second data bus crossing an interface from the first power domain to a second power domain;
a multiplexer (MUX) coupled to the N AFIFO outputs and configured to transfer data over the second data bus of less than N words upon receiving a MUX input;
a synchronizer in the first power domain configured to provide the MUX input; and
read logic in the second power domain to send an asynchronous read pointer across the interface to the synchronizer, and to receive the data,
wherein a width of the second data bus is independent of a depth N of the AFIFO and dependent on a number of stages in the synchronizer.

2. The circuit of claim 1, further comprising:
a second synchronizer in the second power domain configured to allow the read logic to determine when new data is present in the AFIFO; and
write logic in the first power domain configured to send an asynchronous write pointer to:
the AFIFO for tracking data writes to the AFIFO, and
the second synchronizer across the interface.

3. The circuit of claim 1, further comprising:
a plurality of cells coupled to the second data bus and arranged between the MUX and the read logic and configured to modify the less than N words on the second data bus to be compatible with a power supply in the second power domain.

4. The circuit of claim 3, wherein the cells comprise at least one of isolation cells, level-shifter cells or register retention cells.

5. The circuit of claim 1, wherein the synchronizer is a plurality of flip-flops.

6. The circuit of claim 1, further comprising:
a second synchronizer in the second power domain configured to allow the read logic to determine when new data is present in the AFIFO, wherein the second synchronizer is a plurality of flip-flops.

7. The circuit of claim 1, further comprising:
a converter configured to decode a gray-encoded read pointer, wherein the asynchronous read pointer is the gray-encoded read pointer, and the synchronizer is coupled to the converter in the first power domain.

8. The circuit of claim 1, wherein the width of the second data bus further depends on a ratio of a read-to-write frequency of the AFIFO.

9. The circuit of claim 1, further comprising:
a second synchronizer in the second power domain configured to allow the read logic to determine when new data is present in the AFIFO; and
write logic in the first power domain configured to send an asynchronous write pointer to:
the AFIFO for tracking data writes to the AFIFO, and
the second synchronizer across the interface;
wherein a rate of transferring the data through the MUX is determined such that the asynchronous read pointer and the asynchronous write pointer have predictable values in the first power domain and the second power domain, respectively, after passing through the synchronizer and the second synchronizer, respectively.

10. The circuit of claim 1, further comprising:
a second synchronizer in the second power domain configured to allow the read logic to determine when new data is present in the AFIFO;
wherein the synchronizer and the second synchronizer are respectively configured to operate on both a rising edge and a falling edge of a respective clock input to allow multiple read operations within a clock cycle.

11. The circuit of claim 1, further comprising:
a second synchronizer in the second power domain configured to allow the read logic to determine when new data is present in the AFIFO;
wherein at least one of the synchronizer and the second synchronizer includes an edge detector circuit configured to output a pulse upon detecting at least one of a rising edge or a falling edge of a respective clock input.

12. The circuit of claim 1, wherein the second data bus comprises a multiple-word interface from which read operations via the MUX input are configured to occur, when data is available, for alternate cycles of a clock input received at the read logic.

13. The circuit of claim 1, wherein circuit elements in the first power domain are configured to be supplied by a first power source that is different from, or identical to, a second power source configured to supply circuit elements in the second domain.

14. The circuit of claim 1, wherein the first power domain and the second power domain, while configured as asynchronous, share an identical clock source.

15. The circuit of claim 1, wherein the read logic is further configured to use a read clock input to sequentially latch the data from the second data bus onto a third data bus, wherein the third data bus has a width that is smaller than the width of the second data bus.

16. A storage controller, comprising:
an asynchronous first-in first-out buffer (AFIFO) in a first power domain coupled to a first data bus and configured to store N data words corresponding to N respective AFIFO outputs;
a fixed interface between the first power domain and a second power domain;

a multiplexer (MUX) coupled to the N AFIFO outputs and configured to asynchronously transfer, upon receiving a MUX input, less than N words onto the fixed interface;

a synchronizer in the first power domain configured to provide the MUX input; and read logic in the second power domain configured to send an asynchronous read pointer to the synchronizer and to send the less than N words transferred onto the fixed interface to a second data bus, wherein a width of the fixed interface is independent of a depth N of the AFIFO and dependent on a number of stages in the synchronizer.

17. The storage controller of claim 16, further comprising:
a plurality of cells coupled to the fixed interface and arranged between the MUX and the read logic and configured to modify the less than N words on the fixed interface to be compatible with a power supply in the second power domain.

18. The storage controller of claim 16, further comprising write logic in the first power domain configured to send asynchronous write pointers to:
the AFIFO for tracking data writes to the AFIFO, and
the read logic to determine values of the asynchronous read pointer.

19. The storage controller of claim 16, wherein the synchronizer is a plurality of flip-flops.

20. A storage controller, comprising:
an asynchronous first-in first-out buffer (AFIFO) in a first power domain coupled to a first data bus and configured to store N data words corresponding to N respective AFIFO outputs;

a fixed interface between the first power domain and a second power domain;

a multiplexer (MUX) in the first power domain coupled to the N AFIFO outputs and configured to transfer, upon receiving a MUX input, less than N words onto the fixed interface;

a first synchronizer in the first power domain configured to provide the MUX input;

read logic in the second power domain for sending an asynchronous read pointer to the first synchronizer and for sending the less than N words transferred to the fixed interface to a second data bus;

a second synchronizer in the second power domain configured to provide a synchronized write pointer to the read logic; and write logic in the first power domain for sending an asynchronous write pointer to the AFIFO for tracking data writes and to the second synchronizer, wherein a width of the fixed interface is independent of a depth N of the AFIFO and dependent on a number of stages in the first synchronizer.

* * * * *